United States Patent
Kobayashi et al.

(10) Patent No.: US 6,887,925 B1
(45) Date of Patent: May 3, 2005

(54) MOLDING MATERIAL FOR USE WITH CARBON DIOXIDE REFRIGERANT

(75) Inventors: Osamu Kobayashi, Ibaraki (JP); Hideyuki Tokumitsu, Ibaraki (JP); Masashi Kudo, Kanagawa (JP)

(73) Assignee: NOK Corporation, Tokyo (JP)

( * ) Notice: Subject to any disclaimer, the term of this patent is extended or adjusted under 35 U.S.C. 154(b) by 0 days.

(21) Appl. No.: 09/980,225

(22) PCT Filed: Jul. 31, 2000

(86) PCT No.: PCT/JP00/05131

§ 371 (c)(1), (2), (4) Date: Nov. 29, 2001

(87) PCT Pub. No.: WO01/09237

PCT Pub. Date: Feb. 8, 2001

(30) Foreign Application Priority Data

Jul. 30, 1999 (JP) .......................... 11/217043

(51) Int. Cl.⁷ .................. C08K 5/15; C08L 27/00; C08F 114/02
(52) U.S. Cl. .................. 524/114; 524/261; 524/519; 524/567; 525/331.4; 525/331.5
(58) Field of Search .................. 524/114, 261, 524/519, 567, 264, 265; 525/331.4, 331.5

(56) References Cited

U.S. PATENT DOCUMENTS

| | | | |
|---|---|---|---|
| 3,209,055 A | 9/1965 | Hedberg et al. ............. 260/897 |
| 3,531,455 A | 9/1970 | Straub ....................... 260/94.9 |
| 3,940,456 A | 2/1976 | Frey et al. | |
| 4,180,531 A | 12/1979 | Alia ........................... 525/214 |
| 4,263,200 A | 4/1981 | Busch et al. ............. 260/42.49 |
| 4,503,192 A | 3/1985 | McShane ................... 525/192 |
| 4,558,102 A | * 12/1985 | Miyata ....................... 525/348 |
| 5,230,936 A | 7/1993 | Misumi et al. ............ 428/36.6 |
| 5,484,844 A | * 1/1996 | Oshima et al. ............. 524/521 |
| 5,914,195 A | * 6/1999 | Hori et al. .................. 428/520 |

FOREIGN PATENT DOCUMENTS

| | | |
|---|---|---|
| EP | 0 014 336 | 8/1980 |
| EP | 0 293 059 | 11/1988 |
| EP | 0 298 765 | 1/1989 |
| EP | 0 300 401 | 1/1989 |
| EP | 0 343 657 | 11/1989 |
| EP | 0 761 754 | 3/1997 |
| GB | 899 397 | 6/1962 |
| GB | 1 134 362 | 11/1968 |
| JP | 50-64347 | 5/1975 |
| JP | 55-99940 | 7/1980 |
| JP | 59-219355 | 12/1984 |
| JP | 62-81437 | 4/1987 |
| JP | 2-20545 | 1/1990 |
| JP | 2-99548 | 4/1990 |
| JP | 9-292063 | 11/1997 |
| WO | WO 93/24940 | 12/1993 |

* cited by examiner

Primary Examiner—Peter D. Mulcahy
(74) Attorney, Agent, or Firm—Butzel Long

(57) ABSTRACT

A molding material for use with carbon dioxide, which comprises chlorinated polyethylene having a chlorine content of 25–47% by weight or a blend of chlorinated polyethylene with vinyl chloride-based resin, can be used as a suitable material for sealing materials in carbon dioxide-contacting apparatuses using carbon dioxide as a refrigerant. Addition of a specific silane coupling agent to the molding material can effectively prevent vulcanization moldings from blister generation.

7 Claims, No Drawings

MOLDING MATERIAL FOR USE WITH CARBON DIOXIDE REFRIGERANT

TECHNICAL FIELD

The present invention relates to a molding material for use with carbon dioxide refrigerant, and more particularly to a molding material for use with carbon dioxide refrigerant with distinguished resistance to carbon dioxide gas permeation and volumic swelling.

BACKGROUND ART

Freon R-134a (1,1,1,2-tetrafluoroethane) called a new refrigerant is now mainly used in refrigerators, etc., but it is expected that its use would be prohibited in future in view of problems of environmental control, etc. Hydrocarbon gases and carbon dioxide are now regarded as important substitutes for such a refrigerant. Hydrocarbon gases have a considerably high risk of explosion or combustion and the world trend toward the next generation refrigerant is shifting to carbon dioxide.

Carbon dioxide requires a higher pressure than freon and also has higher permeability and solubility into ordinary polymer materials and thus has a higher chance of blister (foaming) generation. Even if there is no blister generation, carbon dioxide gas permeates through the polymer materials, resulting in failure of pressure maintenance or tight sealing.

Even rubber materials have a high carbon dioxide gas permeability in general, and the permeability is considerably high particularly under pressure of 10 atm or higher, resulting in failure of tight sealing of carbon dioxide gas. Furthermore, carbon dioxide is very soluble into polymers, giving rise to considerable polymer swelling. Thus, no rubber material parts have been actually applied to apparatuses using carbon dioxide.

in case of the conventional freon gas refrigerants, hydrogenated NBR, EPDM, etc. have been used as molding materials for sealing materials, but these rubber materials considerably swell or blister through contact with carbon dioxide as disadvantages.

DISCLOSURE OF THE INVENTION

An object of the present invention is to provide a molding material for use with carbon dioxide refrigerant, which can be used as suitable molding materials for sealing materials, etc. in carbon dioxide refrigerant-contacting apparatuses.

The object of the present invention can be attained by a molding material for use with carbon dioxide refrigerant, which comprises chlorinated polyethylene having a chlorine content of 25–47% by weight. A blend of chlorinated polyethylene with vinyl chlorine-based resin can be also used. Furthermore, it is particularly effective for prevention of blister generation to add a specific silane coupling agent thereto.

Chlorinated polyethylene for use in the present invention has a chlorine content of 25–47% by weight, preferably 28–24% by weight. The lower the chlorine content than 25% by weight, the nearer to the property of polyethylene, resulting in loss of rubber elasticity. Sealing materials molded from such chlorinated polyethylene will have poor sealing. With a higher choice content than 47% by weight, the low temperature resistance, heat resistance, etc. will be lowered. Actually, commercial products with the above-mentioned range of chlorine content, for example, Elaslene series of Showa Denko products, can be used as such.

Chlorinated polyethylene with such a range of chlorine content can be usually used alone, but in case of improving vulcanization product properties such as tensile strength, elongation, etc. at somewhat the sacrifice of resistance to carbon dioxide gas permeation and volume swelling, a blend of chlorinated polyethylene with vinyl chloride-based resin, usually polyvinyl chloride, can be also used, where a blending proportion of vinyl chloride-based resin is not more than about 50% by weight, preferably about 10 to about 40% by weight, on the basis of the blend.

From the viewpoint of dynamic properties and resistance to gas permeation of chlorinated polyethylene or its blend, about 5 to about 150 parts by weight, preferably about 10 to about 100 parts by weight, of an inorganic filler is added a 100 parts by weight of chlorinated polyethylene or its blend. Reinforcing fillers such as carbon black, silica, etc. can be usually used as an inorganic filler. Furthermore, non-reinforcing fillers such as calcium metasilicate, diatomoceous earth, graphite, mica, calcium carbonate, zinc oxide, etc. can be also used together with the reinforcing fillers.

Furthermore, an organic peroxide is added as a cross-linking agent to the molding material comprising the above-mentioned components. Organic peroxide for use in the present invention includes, for example, 1,1-bis(t-butylperoxy)-3,5,5-trimethylcyclo-hexane, 2,5-dimethylhexane-2,5-dihydroxyperoxide, di-t-butyl peroxide, t-butyl cumyl peroxide, dicumyl peroxide, t-butylperoxyisopropyl carbonate, n-butyl-4,4-di(t-butylperoxy) valerate, α, α-bis(t-butylperoxy)-p-diisopropylbenzene, 1,3-di(t-butyl-peroxyisopropyl) benzene, 2,5-dimethyl-2,5-di(t-butylperoxy)hexane, 2,5-dimethyl-2,5-di-(t-butylperoxy)hexine-3, benzoyl peroxide, t-butylperoxy-benzene, 2,5-dimethyl-2,5-di(benzoylperoxy) hexane, etc., and is used in a proportion of about 1 to about 10 parts by weight, preferably about 2 to about 8 parts by weight on the basis of 100 parts by weight of chlorinated polyethylene or its blend. In a lower proportion of organic peroxide than about 1 part by weight no satisfactory cross-linking density can be obtained, whereas in a higher proportion than about 10 parts by weight no vulcanization moldings can be obtained due to foaming, or rubber elasticity, elongation or compression set characteristics will be inevitably lowered, even if moldings can be obtained.

To the molding material containing an organic peroxide as a cross-linking agent it is added about 0.1 to about 10 parts by weight, preferably about 1 to about 5 parts by weight, of a polyfunctional unsaturated compound, typically triallyl isocyanurate, triallyl cyanurate, etc. as a cocross-linking agent on the basis of 100 parts by weight of chlorinated polyethylene or its blend. When the cross-linking agent and the cocross-linking agent are used in higher proportions than about 10 parts by weight, respectively, scorching, etc. will take place.

Furthermore, it is effective for prevention of blister generation due to contact with carbon dioxide to add at least 0.2 parts by weight, preferably about 0.5 to about 5 parts by weight, of a specific silane coupling agent to 100 parts by weight of chlorinated polyethylene or its blend with vinyl chloride-based resin.

Such a specific silane coupling agent includes, for example, vinylic silane coupling agents such as vinyltrimethoxysilane, vinyltriethoxysilane, vinyltris(2-methoxyethoxy)silane, vinyltrichlorosilane, etc., epoxy silane coupling agents such as γ-glycidoxypropyltrimethoxysilane, γ-glycidoxypropyltriethoxysilane, γ-glycidoxypropylmethyldiethoxysilane, etc., and methacryloxysilane coupling agents such as γ-methacryloxypropyltrimethoxysilane, γ-methacryloxypropyltriethoxysilane, γ-methacryloxypropymethyldimethoxysilane, γ-methacryloxypropylmethyldiethoxysilane, etc.

Chlorinated polyethylene composition comprising the foregoing components can be prepared by further adding thereto, if required, various additives, for example, a processing aid such as stearic acid, palmitic acid, paraffin wax, etc., an acid acceptor such as zinc oxide, magnesium oxide, etc., an antioxidant, a plasticizer, etc. properly, followed by kneading through Intermix, kneader, Banbury mixer, etc. or through open rolls.

Vulcanization of the compositions is carried out usually by heating at about 150" to about 200° C. for about 3 to about 60 minutes though a vulcanization press, an injection molding machine, a compression molding machine, etc., and, if required, secondary vulcanization is carried out by heating at about 120° to about 200° C. for about 1 to about 24 hours.

BEST MODE FOR CARRYING OUT THE INVENTION

The present invention will be described below, referring to Examples.

EXAMPLE 1

| | Parts by weight |
|---|---|
| Chlorinated polyethylene (Elaslene 302NA, product by Showa Denko K. K.; chlorine content: 29 wt. %) | 100 |
| Carbon black (Thermax N990, product by Cancarb) | 120 |
| Magnesium oxide (Kyowa Mag #150, product by Kyowa Kagaku K. K.) | 5 |
| Organic peroxide (Percumyl D. product by NOF Corp.) | 5 |
| Triallyl isocyanurate (Tyke, product by Nihon Kasei K. K.) | 3 |

The foregoing components were kneaded through 10-inch open rolls (roll temperature: 130° C.), and the kneading product was press vulcanized at 180° C. for 6 minutes to obtain a vulcanization molded circular sheet, 90 mm in diameter and 0.5 mm thick.

A disc sample, 50 mm in diameter, was cut out from the circular sheet and mounted on a high pressure gas permeability tester to determine a $CO_2$ permeability under high pressure (60 atm). It was found to be $2.7 \times 10^{-10}$ $cm^3$(STP·cm/$cm^2$·sec·cmHg. Furthermore, a rectangular sample, 20 mm×5 mm, was cut out from the circular sheet and exposed to a $CO_2$ atmosphere under high pressure (60 atm) in a pressurizing apparatus with a window. A volumic swelling rate ΔV was measured by a cathetometer and found to be 10 vol. %.

EXAMPLE 2

In Example 1, the same amount of Elaslene 406AE, a product by Showa Denko K. K. (chlorine content: 39.5 wt. %) as chlorinated polyethylene and 70 parts by weight of Seest G-S, product by Tokai Carbon Co., Ltd. as carbon black were used. It was found that $CO_2$ permeability was $4.8 \times 10^{-10} cm^3$(STP)·cm/$cm^2$·sec·cmHg and volumic swelling rate ΔV was 11 vol. %.

EXAMPLE 3

In Example 2, the amount of carbon black was changed to 50 parts by weight and 40 parts by weight of Nipseal ER, product by Nippon Silica K. K. was additionally used as white carbon. It was found that $CO_2$ permeability was $3.9 \times 10^{-10} cm^3$(STP)·cm/$cm^2$·sec·cmHg and volumic swelling rate ΔV was 10 vol. %.

EXAMPLE 4

In Example 1, the same amount of Elaslene 452NA, product by Showa Denko K. K. (chlorine content: 44.5 wt. %) was used as chlorinated polyethylene and the amount of carbon black was changed to 90 parts by weight. It was found that $CO_2$ permeability was $2.2 \times 10^{-10} cm^3$ (STP)·cm/$cm^2$·sec·cmHg and volumeric swelling rate ΔV was 9 vol. %.

EXAMPLE 5

In Example 1, the amount of chlorinated polyethylene was changed to 70 parts by weight and 30 parts by weight by polyvinyl chloride (ZEST800Z, product by Shin-Daiichi Enbi K. K.) was used as a blend with the chlorinated polyethylene. It was found that $CO_2$ permeability was $7.6 \times 10^{-10} cm^3$(STP)·cm/$cm^2$·sec·cmHg and volumeric swelling rate ΔV was 16 vol. %.

COMPARATIVE EXAMPLE 1

| | Parts by weight |
|---|---|
| Hydrogenated NBR (Zetpol 1020, product by Nippon Zeon Co., Ltd.) | 100 |
| Carbon black (Thermax N990) | 80 |
| Magnesium oxide (Kyowa Mag #150) | 5 |
| Organic peroxide (Percumyl D) | 5 |
| Triallyl isocyanurate (Tyke) | 3 |

The foregoing components were subjected to kneading, vulcanization, molding and determination in the same manner as in Example 1, and it was found that $CO_2$ permeability was $7.3 \times 10^{-9} cm^3$(STP)·cm/$cm^2$·sec·cmHg and volumeric swelling rate ΔV was 31 vol. %.

Vulcanization molding products of the foregoing Examples and

Comparative Example were subjected to determination of normal state physical properties according to JIS K-6301. The results are give in the following Table 1.

TABLE 1

| Example No. | Tensile strength (MPa) | Elongation (%) |
|---|---|---|
| 1 | 15 | 200 |
| 2 | 16 | 210 |
| 3 | 17 | 190 |
| 4 | 17 | 205 |
| 5 | 22 | 275 |
| Comp. Ex. 1 | 18 | 250 |

EXAMPLE 6

| | Parts by weight |
|---|---|
| Chlorinated polyethylene (Elaslene 352NA, product by showa Denko K. K., chlorine content: 35 wt. %) | 100 |
| SRF carbon black | 55 |
| Magnesium oxide | 5 |
| Dicumyl peroxide | 4 |
| Triallyl isocyanurate | 5 |
| Vinylic silane coupling agent (vinyl triethoxysilane) | 2 |

The foregoing components were kneaded through a kneader and open rolls, and the kneading product was press vulcanized at 170° C. for 30 minutes and then oven vulcanized (second vulcanizataion) at 140° C. for 10 hours to obtain a vulcanization sheet, 150 mm×150 mm×2 mm.

EXAMPLE 7

In Example 6, the same amount of epoxy silane coupling agent (γ-glycidoxypropyltriethoxysilane) was used in place of the vinylic silane coupling agent.

EXAMPLE 8

In Example 6, the same amount of methacryloxy silane coupling agent (γ-methacryloxypropyltriethyoxysilane) was used in place of the vinylic silane coupling agent.

COMPARATIVE EXAMPLE 2

In Example 6, the amount of dicumyl peroxide was changed to 0.5 parts by weight.

COMPARATIVE EXAMPLE 3

In Example 6, the amount of dicumyl peroxide was changed to 12 parts by weight.

COMPARATIVE EXAMPLE 4

In Example 6, the amount of amino silane coupling agent (γ-aminopropyltriethoxysilane) was used in place of the vinylic silane coupling agent.

Vulcanization sheets obtained in the foregoing Examples 6 to 8 and Comparative Examples 2 to 4 were subjected to determination and evaluation of the following items. Results are shown in Table 2. In the case of Comparative Example 3, no vulcanization molding could be carried out due to foaming.

Normal state physical properties: according to JIS K-6253 and JIS K-6251

Compression set: according to JIS K-6262

$CO_2$ resistance: The sheets were dipped into liquefied $CO_2$ at

25° C. for 24 hours, followed by heating at 150° C. for one hour and then by visual inspection of blister generation on the sheet surface

TABLE 2

| Items of determination and evaluation | Ex. 6 | Ex. 7 | Ex. 8 | Comp. Ex. 2 | Comp. Ex. 4 |
|---|---|---|---|---|---|
| [Normal state physical properties] | | | | | |
| Hardness (durometer A) | 85 | 85 | 84 | 74 | 85 |
| Tensile strength (MPa) | 20.0 | 20.2 | 20.7 | 24.8 | 17.9 |
| Elongation (%) | 200 | 210 | 190 | 500 | 350 |
| [Compression set] | | | | | |
| 120° C. for 70 hours (%) | 20 | 20 | 18 | 67 | 43 |
| [$CO_2$ resistance] | | | | | |
| Blister generation | None | None | None | None | Occurred |

INDUSTRIAL APPLICATION

Molding materials for use with carbon dioxide refrigerant, which comprise chlorinated polyethylene, have a $CO_2$ permeability under 60 atm in the order of $10^{-10} cm^3(STP) \cdot cm/cm^2 \cdot sec \cdot cmHg$ or less and a distinguished volumic swelling rate $\Delta V$ of about 10 vol. % or less. When chlorinated polyethylene is used as a blend with vinyl chloride-based resin, good vulcanization product properties such as tensile strength: 18 MPa or higher and elongation: 250% or higher can be obtained, though resistances to carbon dioxide gas permeation and volumic swelling may be somewhat sacrificed. Furthermore, when a specific silane coupling agent is added to chlorinated polyethylene or its blend with vinyl chloride-based resin, blister generation can be effectively prevented.

The present molding materials for use with carbon dioxide refrigerant with the foregoing properties can be used as suitable materials for sealing materials such as packings, gaskets. O-rings, etc. in carbon dioxide refrigerant-contacting apparatuses such as air compressors, refrigerators, supercritical $CO_2$ extraction(chromatography) apparatuses, etc. using carbon dioxide as a refrigerant, and also as suitable materials for sealing materials for refrigerator oil (polyalkylene gycol, etc.) applicable to the carbon dioxide refrigerant.

What is claimed is:

1. A molding material for use with carbon dioxide refrigerant that resists blistering when exposed to carbon dioxide refrigerant, which molding material comprises chlorinated polyethylene having a chloride content of 25–47% by weight and a coupling agent selected from the group consisting of epoxy silane coupling agents and methacryloxy silane coupling agents.

2. A molding material for use with carbon dioxide refrigerant according to claim 1, wherein the chlorinated polyethylene is used as a blend with vinyl chloride-based resin.

3. A molding material for use with carbon dioxide refrigerant according to claim 1, wherein an inorganic filler is further contained.

4. A molding material for use with carbon dioxide refrigerant according to claim 1, wherein 1–10 parts by weight of an organic peroxide is further contained on the basis of 100 parts by weight of the chlorinated polyethylene or its blend with the vinyl chloride-based resin.

5. A molding material for use with carbon dioxide refrigerant according to claim 2, wherein an inorganic filler is further obtained.

6. A molding material for use with carbon dioxide refrigerant according to claim 2, wherein 1–10 parts by weight of an organic peroxide is further contained on the basis of 100 parts by weight of the chlorinated polyethylene or its blend with the vinyl chloride-based resin.

7. A molding material for use with carbon dioxide refrigerant according to claim 1, wherein 1–10 parts by weight of an organic peroxide is further contained on the basis of 100 parts by weight of the chlorinated polyethylene or its blend with the vinyl chloride-based resin.

* * * * *